M. J. STEIN.
Improvement in Apparatus for Rendering Animal Matter.
No. 125,853. Patented April 16, 1872.
4 Sheets--Sheet 1.
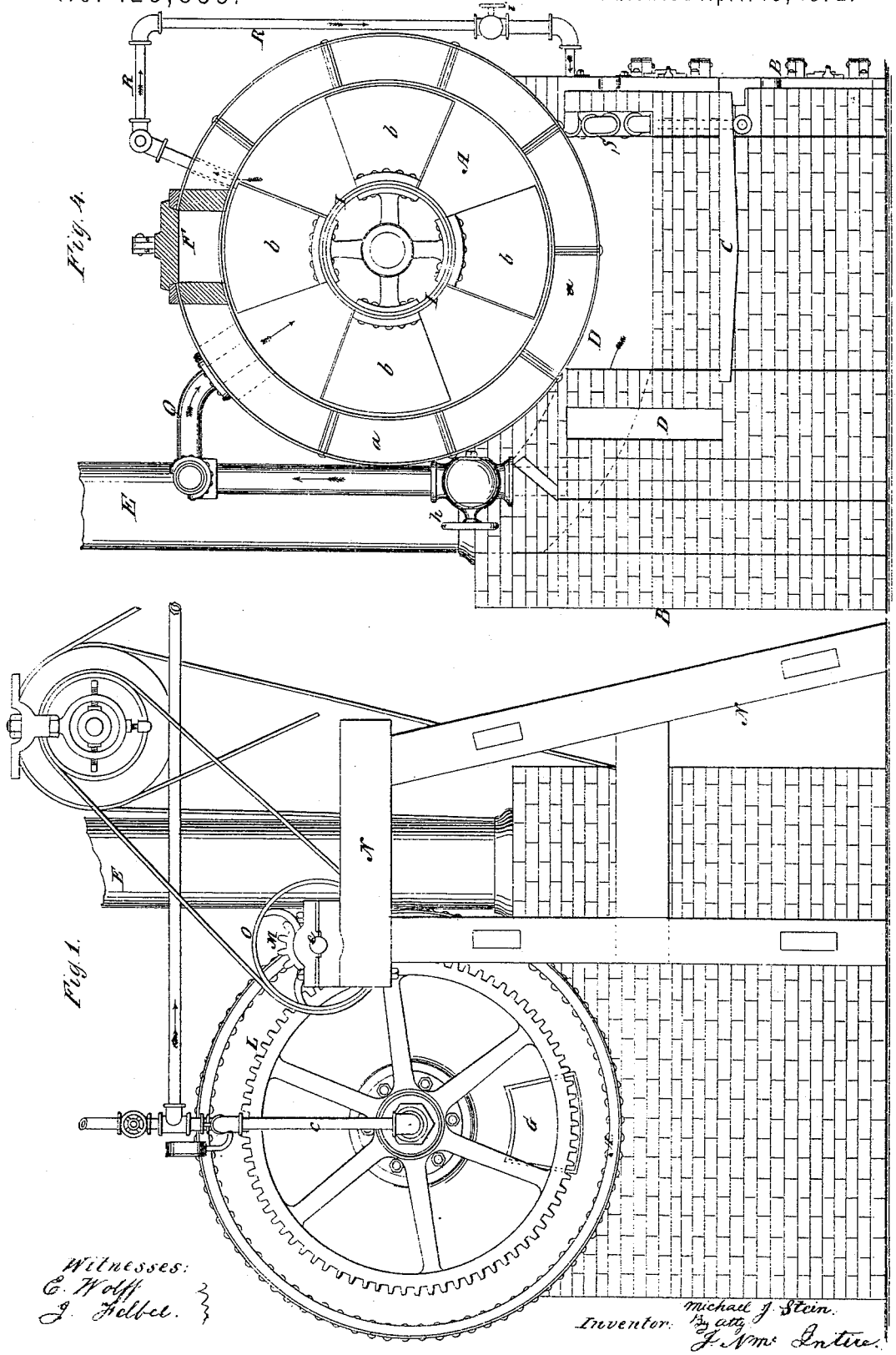

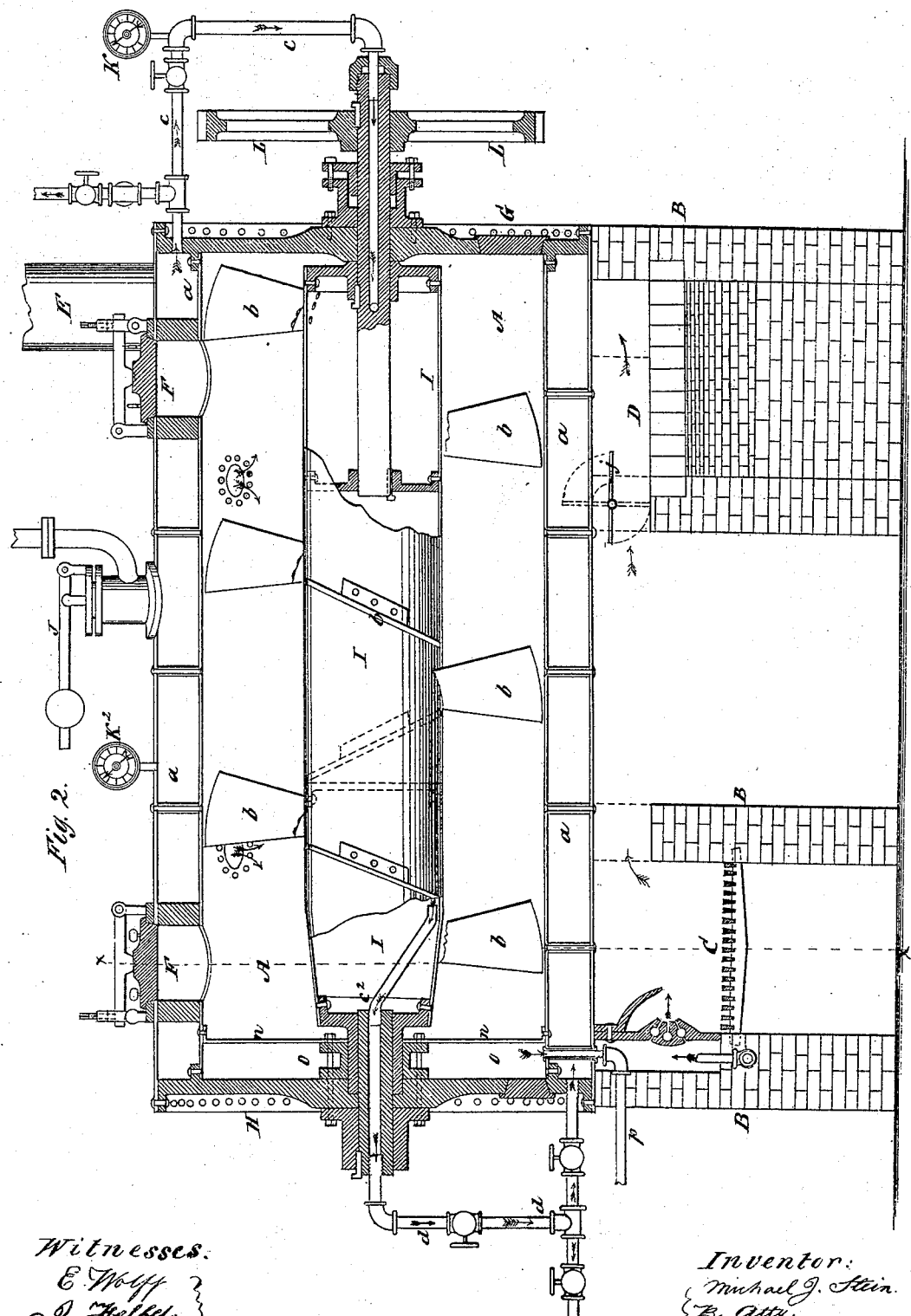

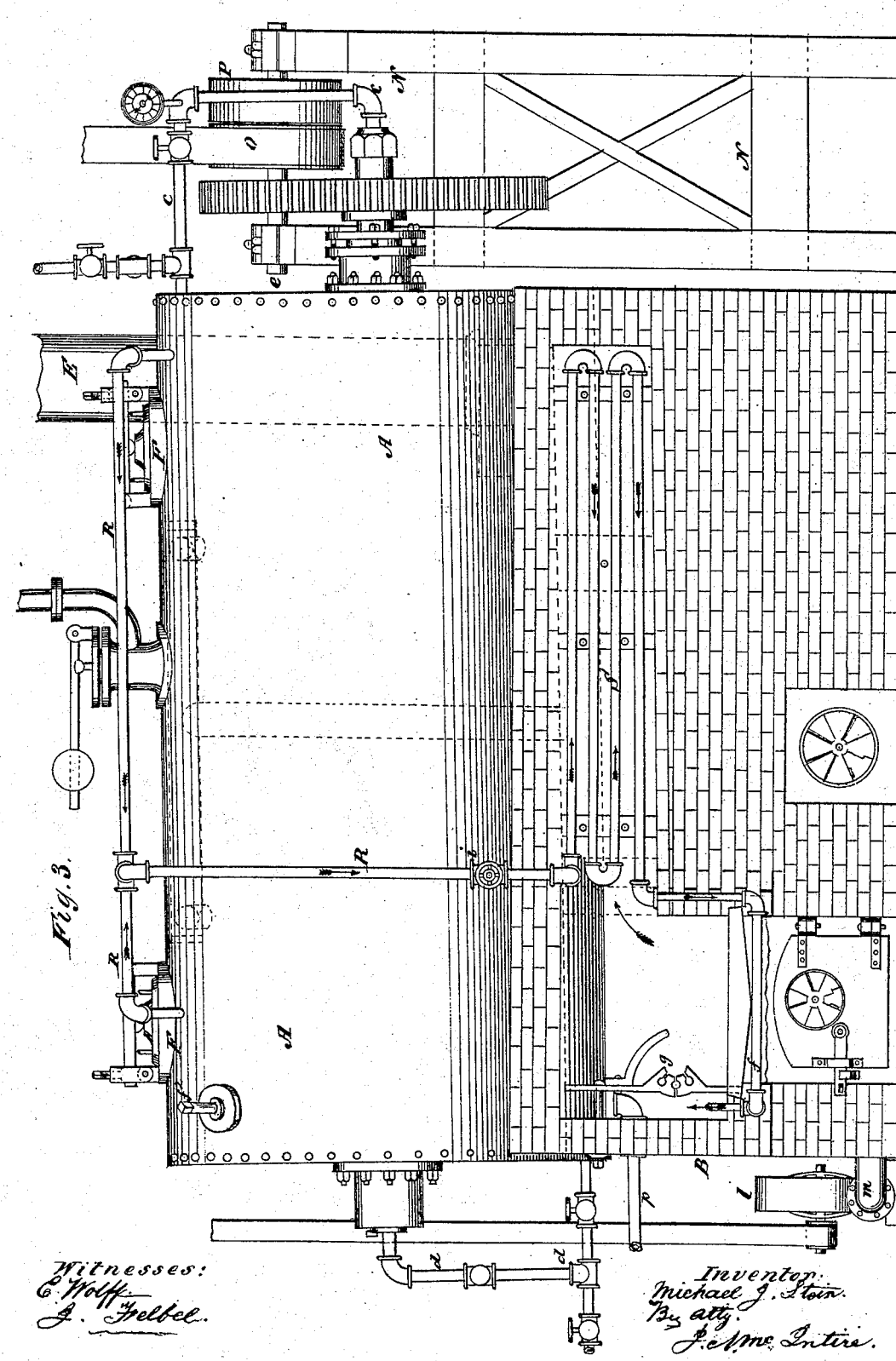

M. J. STEIN.
Improvement in Apparatus for Rendering Animal Matter.
No. 125,853. Patented April 16, 1872.
4 Sheets--Sheet 4.
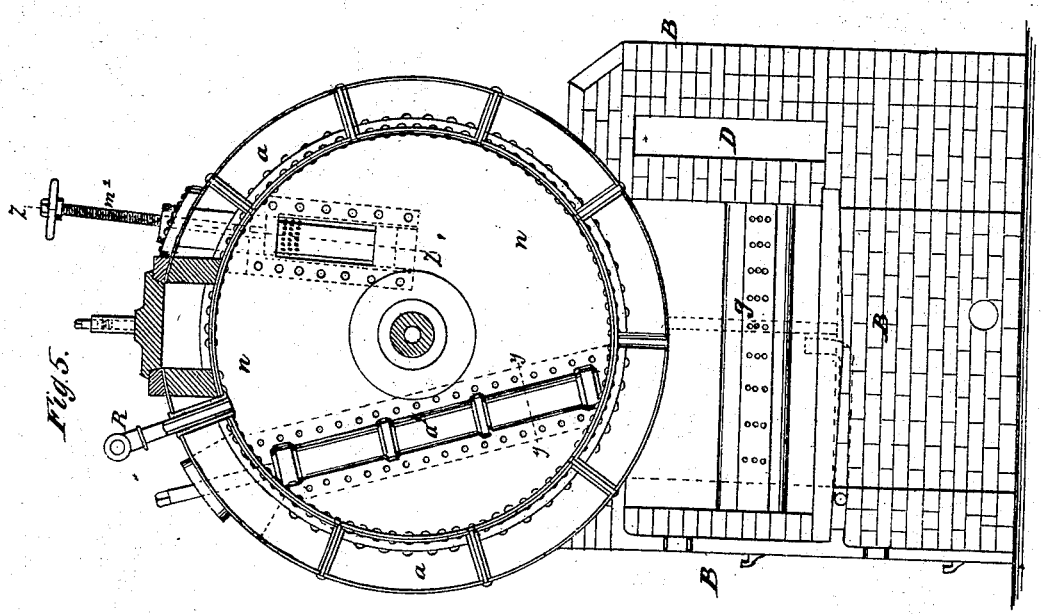
Witnesses:
E. Wolff
J. Felbel
Inventor;
Michael J. Stein
By atty.
J. N. McIntire.

125,853

UNITED STATES PATENT OFFICE.

MICHAEL J. STEIN, OF NEW YORK, N. Y.

IMPROVEMENT IN APPARATUS FOR RENDERING ANIMAL MATTERS.

Specification forming part of Letters Patent No. 125,853, dated April 16, 1872.

*To all whom it may concern:*

Be it known that I, MICHAEL J. STEIN, of the city, county, and State of New York, have invented certain new and useful Improvements in Apparatus for Rendering Animal Matter, and drying and pulverizing the scrap thereof; and I do hereby declare the following to be a full, clear, and exact description thereof, reference being had to the accompanying drawing forming part of this application.

Previous to my invention it has been customary, in the treatment of animal matters for the extraction of the fat therefrom, and to reduce the "scrap" or residuum to a "fertilizer," to perform the necessary rendering, drying, and pulverizing processes separately; and separate and distinct apparatus have generally been employed to carry on the said several processes.

My invention has for its main object to provide an apparatus in which may be efficiently and economically carried on or conducted either one or all of the said several processes of rendering, drying, and pulverizing; and my invention has for a further object to render such an apparatus more efficient in its operations, either when used for carrying on all three of said processes or when used for conducting any one of said processes. To these ends and objects my invention consists in the employment, in combination with a rendering-chamber and suitable means for separating the liquid from the solid matter during the rendering operation, of devices arranged in said chamber for stirring its contents and assisting in the generation into steam of all moisture contained in the residuum of the rendering process, and a suitable means for carrying off from said chamber the steam and vapor so generated, together with all noxious gases, and effecting the destruction thereof in the furnace of the apparatus, as will be hereinafter more fully described; and my invention further consists in the employment, in combination with the rendering-chamber and suitable means for separating the liquid from the solid matter, and means for extracting from the latter all remaining moisture, of rotatory arms arranged upon a shaft or shafts passing through the said chamber, and suitable means for imparting motion to said arms, at the pleasure of the attendant, for the purpose of pulverizing or reducing to a powdered condition the dried scrap or residuum, as will be hereinafter more fully explained; and my invention further consists in the use, in connection with the rendering-chamber and a receptacle, into which the liquid matter is discharged, of a device, substantially such as hereinafter described, for effecting the separation of the fatty portion from the watery portion of the liquid discharged from the rendering-chamber into said receptacle, in the manner and for the purposes to be hereinafter more fully explained; and my invention further consists in the employment, in combination with the rendering-chamber, the means for separating the liquid from the solid portion of its contents, and the means for extracting and carrying off to the furnace for consumption the contained moisture and gases of the residuum, of a means, substantially such as hereinafter described, for forcing currents of hot air from the furnace-flues into the rendering and drying chamber, and thence into an argand-burner device, where said currents are mingled with jets of fresh air for inducing their entire destruction and a higher degree of combustion in the furnace-fire, all substantially as will be hereinafter described. My invention further consists in the use, in connection with a chamber adapted to contain the material to be treated, and suitable means for drying and pulverizing the latter, of rotatory arms, which are arranged helically upon the shaft, and a door or man-hole at one end and near the lowest part of said chamber, whereby the discharge of the entire contents of said chamber may be automatically effected, as will be hereinafter more fully explained.

To enable those skilled in the art to make and use my invention, I will proceed to more fully describe the construction and operation of my improved apparatus, referring by letters to the accompanying drawing, in which—

Figure 1 is an end elevation; Fig. 2, a longitudinal vertical section; Fig. 3, a similar section on a different plane; Fig. 4, a vertical cross-section at $x\ x$, Fig. 2; Fig. 5, a similar section in the same plane, but looking in an opposite direction; Fig. 6, a partial sectional elevation of the chamber and liquid-separating device; Fig. 7, a detail cross-section at $y\ y$, Fig. 5; Fig. 8, a detail section at $z\ z$, Fig. 5; and Fig. 9, a detail cross-section at $y\ y$, Fig. 8.

In the several figures the same part will be found designated by the same letter of reference.

A is a cylindrical chamber or vessel, mounted in suitable brick-work B, in which are provided a furnace, C, and flues D, the latter communicating with an ordinary chimney, E. The said cylinder A is made, as represented, with a shell, $a$, adapted to contain water (and steam generated therefrom;) has suitable man-holes E, F, and G, and solid heads H H, in which latter are mounted the journals of a hollow shaft or drum, I, which is arranged axially within the chamber A, and on which are arranged, in the form of a screw, (or in helical curves,) a series of arms, $b\ b$, extending nearly to the internal face or circumference of chamber A. The drum I is supplied with steam by pipes $c$, and the steam passes from said drum through pipes $d$, arranged at the opposite end to that at which pipes $c$ are located. J is an ordinary safety-valve, and K $K^2$ are pressure-gauges, connected, respectively, to the interior chamber and to the shell portion $a$ of the cylinder A. On one of the journals of drum I is arranged a driving-gear, L, which engages with a suitable pinion, M, on a counter-shaft, $e$, mounted on suitable frame-work N. On said counter-shaft are arranged fast and loose pulleys O P, which are belted to any suitable motor. Q are pipes extending up from the flues of the furnace, and communicating with the interior of chamber A, and R are pipes extending from the interior of said chamber down to a superheater, S, which communicates, through a pipe, $f$, with an argand-burner device, $g$. The pipes Q and R are provided, respectively, with cocks $h$ and $i$, as clearly illustrated. $j$ is a damper, arranged in the flue which leads to the chimney, and $l$ is an ordinary fan-blower, driven in any suitable manner, and by which a blast of fresh air may be forced, at pleasure, through the pipe $m$ into the furnace-fire. Near one end of the interior chamber of cylinder A is formed, by a partition, $n$, a separate compartment, $o$, from the bottom of which extends a pipe, $p$, for the discharge of the liquid matters. In the partition $n$ are located two valve devices, $a^2$ and $b^2$, the latter of which is used to draw off from the rendering-chamber into the compartment $o$ the fatty portions of the liquid contents of said chamber, and the former to subsequently draw off from said chamber the watery portions of said liquid contents, as will be presently more fully described.

Before proceeding to an explanation of the operations of the apparatus I will briefly describe the peculiar operations and offices of the two valve devices just alluded to. The one marked $a^2$ is a sort of rotatory register-like valve, arranged in the partition $n$. It has a central shaft, $f^2$, which protrudes through the body of cylinder A, (see Figs. 3 5 6,) and by means of which it is operated at the pleasure of the attendant. When turned in one position (as seen in Figs. 6 7) it opens a free communication between the interior of chamber A and the compartment or receptacle $o$, and when turned in an opposite position it cuts off such communication.

It will be understood that when the valve $a^2$ is open any and all liquid matter existing at any level in the chamber A can run or be be forced into the compartment $o$, to be from thence drawn off through exit-pipe $p$. The valve device $b^2$ is made (somewhat like $a^2$) of two tubes, one working within the other, but it operates entirely different from $a^2$. It does not rotate, but has a reciprocating motion, effected by means of a screw-shaft, $m^2$, which protrudes through the cylinder A and may be turned at pleasure by the attendant. The office and operation of this valve $b^2$ is such that it permits at all times the free passage through it of any liquid matter which may be as high up in the chamber A as to come opposite the perforated portion of $b^2$, and it will be understood that the height or location of the perforated portion of the inner tube $n^2$ of this valve, which forms the communication between chamber A and compartment $o$, is controlled and varied by sliding said tube $n^2$ up and down, by turning the shaft $m^2$. It will be seen that by the use of two such valve arrangements, as described, the fatty portions of the liquid, which rise to the top, may be first drawn off by the valve $b^2$ moving its perforated tube gradually down to near the level of the watery stratums of the liquid contents, and the watery portions are subsequently discharged through the valve $a^2$; and that by this combination of valves the fatty and watery portions may be, so far as is practicable, separated before their discharge into the exit-pipe $p$.

The general operation of the apparatus, in the performance of the rendering, drying, and pulverizing processes, needs but little explanation after what has been said of the construction and operations of the several parts of the machine.

The material to be treated, having been put as usual into the chamber A, and the man-holes all closed, the chamber is heated up, the furnace generating steam in the shell $a$ of the rendering-chamber. As the cooking or rendering process progresses, the fat is melted or rendered out by the heat radiated from interior surfaces of vessel A and from the steam-heated drum I, and also by the steam generated within the cooking-chamber, from water contained in the material being treated. The steam and gases generated in the chamber A are permitted to escape at the proper times, through tubes R, down to and through the superheater S, and thence to the argand-burner device $g$, where such (superheated) vapors and gases are utilized to increase the combustion going on in the furnace, while at the same time all noxious odors are thus effectually destroyed. As the fat is rendered out of the charge of material it is drawn off in a liquid state, through the valve $b^2$, into chamber $o$, and thence through conduit-pipe $p$ is carried off to the coolers. As the liquid fat and water accumulates in the vessel A, the attendant adjusts the valve $b^2$, keeping valve $a^2$ closed, so as to draw off or permit the escape at proper times of the fatty portions of the liquid which are nearest the top of the mass in vessel A; and after the greater part of the fatty liquid, or all that it is practicable to separate from the watery portion, has been taken off to the coolers, the valve $a^2$, which opens communication between A and $o$ during their whole heights, is opened and all the remaining liquid that it is practicable to draw off is carried into compartment $o$ and thence off at the exit-pipe $p$. By this combination of valves or by the use of two devices, as described, one for drawing off the fat and the other for drawing off the water, a separation of the fat and water is effected, and the scrap is left in the vessel A. If it be desired now that the scrap or residuum be deprived of all remaining moisture and noxious gases and thoroughly dried, the heat is continued, the agitators put in motion, and the mass of solid scrap is partially disintegrated, and all its contained water generated into steam, which is eventually carried off, through the pipes R, to the superheater and furnace. To complete the drying process I make use of the blower $l$ and force blasts of air into the furnace, where it is highly heated, and thence through pipes Q into the vessel A. To do this the damper $j$ and the cock $h$, of pipe Q, are opened, and the communication through pipes R to the superheater must be opened. After the drying process has been thoroughly effected, if it be desired to pulverize or reduce to a powdered condition the dried residuum, the heat is continued and the pulverizing-arms $b$ rotated in different directions for a short time, and by this means the scrap will be reduced to a finely-powdered condition and make a most desirable fertilizer. After all these operations have been performed in the apparatus, the finished fertilizer may be automatically discharged by opening the lower man-hole G and rotating the drum I and helically-arranged arms $b$ continuously in the one direction, which will screw or feed along the contents of vessel A toward and out of the exit-door at G. It will be seen that, by means of an apparatus constructed and operating in the manner described and shown, I am enabled to most economically conduct either one or all three of the processes of rendering, drying, and pulverizing, and that, where all three are performed, without removal of the charge from the chamber A and without opening the latter, all escape of noxious gases, as well as all escape of any of the valuable chemical ingredients of the fertilizer, are effectually prevented. Of course my improved apparatus may be employed with great advantage for conducting any one of the processes or operations referred to, but it is particularly adapted for conducting a most efficient, economical, and in every way desirable "continuous process" of rendering, drying, and pulverizing. I do not, however, wish to be understood as limiting to this combined action any features of novelty which can be used with advantage for conducting separately any one of the named processes.

Having fully explained my invention, so that one skilled can make and use my improved apparatus, what I claim therein as new, and desire to secure by Letters Patent, is—

1. In combination with the rendering-chamber the means for separating the liquid from the solid matter, and the means for drying the latter, a suitable means within the chamber, actuated by a driving mechanism without, for pulverizing the dried residuum, substantially as hereinbefore set forth.

2. In combination with the rendering-vessel and the separate compartment for the collection and discharge of liquid matters, devices or means for effecting the discharge separately of the fatty and watery portions of the liquid contained in the rendering-vessel, substantially as described.

3. In combination with the chamber or vessel A, the means for separating the liquid and solid matters, and the means for drying out the scrap and carrying off the steam and gases, the means shown and described for forcing currents of hot air into and through the said chamber to complete the drying of its contents and insure the carrying off of all foul gases.

4. In combination with the chamber and means for drying and pulverizing the scrap, a screw-feeder or feeders arranged within said chamber and a suitable exit-door, G, by means of which the contents of the chamber may be automatically discharged, as hereinbefore described.

In testimony whereof I have hereunto set my hand and seal, this 18th day of March, 1872.

MICHAEL J. STEIN. [L. S.]

Witnesses:
 JACOB TELBEL,
 CHAS. E. WARREN.